(12) United States Patent
Böttger et al.

(10) Patent No.: US 6,296,095 B1
(45) Date of Patent: Oct. 2, 2001

(54) COUPLING ASSEMBLY WITH DOUBLE SHEAR CHANNEL

(75) Inventors: Frank Böttger, Erkrath (DE); Theodor Gassmann, Rochester, MI (US)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 09/347,617

(22) Filed: Jul. 2, 1999

(30) Foreign Application Priority Data

Jul. 3, 1998 (DE) ............................................. 198 29 720

(51) Int. Cl.[7] ................................................. F16D 43/284
(52) U.S. Cl. ........................... 192/35; 192/57; 192/25 AA
(58) Field of Search ........................... 192/35, 57, 85 AA

(56) References Cited

U.S. PATENT DOCUMENTS

| 4,574,926 | * | 3/1986 | Bubak ........................ 192/85 AA X |
| 4,997,071 | * | 3/1991 | Villata et al. ............... 192/85 AA X |
| 5,556,343 | * | 9/1996 | Gassmann et al. ......... 192/85 AA X |
| 5,706,923 | * | 1/1998 | Gassmann ................... 192/85 AA X |
| 5,935,036 | * | 8/1999 | Gassmann et al. ......... 192/85 AA X |

FOREIGN PATENT DOCUMENTS 43 27 519 A1  2/1995 (DE) .
43 43 307 A1  6/1995 (DE) .

* cited by examiner

*Primary Examiner*—Charles A Marmor
*Assistant Examiner*—Saúl Rodríguez

(57) ABSTRACT

A coupling assembly comprising a friction coupling a pressure-generating device comprising a pump body member, an axially-displaceable piston loading the friction coupling, and a pressure chamber formed by the pump body and by the piston and filled with a highly-viscous fluid, and with at least one conveying plate being provided in the pressure chamber; and a shear channel with a control member in the pressure chamber, the control member cooperating with at least one conveying plate. In a first embodiment, the shear channel with a control member forms two circumferential grooves of limited length and each covered by one of the two radial surfaces of the conveying plate, thereby forming two shear channels. Passages through the conveying plate connect the two shear channels. In a second embodiment, the shear channel with a control member forms a circumferential groove of limited length which is covered by one of the two radial surfaces of the conveying plate to form a first shear channel. In the shear channel with a control member, there is a circumferential slot of limited length which is covered by the other one of the two radial surfaces of the conveying plate and by a second conveying plate, the latter being designed to form a second shear channel. The first conveying plate includes fluid passages extending therethrough and connecting both shear channels to one another.

15 Claims, 12 Drawing Sheets

COUPLING ASSEMBLY WITH DOUBLE SHEAR CHANNEL

BACKGROUND OF THE INVENTION

There are known coupling assemblies for transmitting torque between a first part and a second part, each of said parts being rotatable with respect to one another. A coupling assembly of this type is described in German Patent No. P 43 43 307 C2, and is sold by the assignee of the present application under the trademark VISCO-LOK™.

Such a coupling assembly, which may be referred to as a locking or limited-slip differential device, has various practical applications. A first application is in a differential drive to provide a self-inhibiting or self-locking effect. Such differential drives may constitute axle differentials or central differentials in automotive vehicles.

A second application of a coupling assembly of this type is in the drive train of automotive vehicles having one permanently-driven axle and one axle which is selectively driven only when the coupling assembly is closed, with the coupling assembly being connected between two portions of a shaft linking the source of automotive power to the selectively-driven axle. If a speed differential occurs between the permanently-driven axle and the selectively-driven axle, the coupling assembly is closed to exert torque on the selectively-driven axle. If no speed differential exists between the permanently-driven axle and the selectively-driven axle, the coupling assembly is opened to render the selectively-driven axle free-wheeling.

The reaction behavior of the coupling assembly and the achievable pressure values in the pressure chamber are determined by geometry, particularly by the width and depth of the shear channel. With a predetermined coupling assembly diameter, the width of the shear channel is particularly limited. Although pressure generation may be very effective, and the piston able to apply high forces to the friction coupling, there are applications wherein a more rapid reaction and/or the application of even higher forces to the piston are/is essential, even at small speed differentials.

The present applicants have addressed this need, and have designed a coupling assembly that exhibits such increased performance characteristics without the need for an assembly of undesirably large axial and radial dimensions.

SUMMARY OF THE INVENTION

The present invention is embodied in a coupling assembly for transmitting torque between a first part and a second part, said parts being rotatable with respect to one another. The coupling assembly comprises a friction coupling having first friction plates non-rotatably connected to the first part of the coupling assembly and second friction plates non-rotatably connected to the second part of the coupling assembly. The coupling assembly further comprises a pressure-generating device comprising a pump body member, an axially-displaceable piston loading the friction coupling, and a pressure chamber formed by the pump body and by the piston and filled with a highly-viscous fluid, with the pump body member being non-rotatably connected to the first part of the coupling assembly, and with at least one conveying plate being provided in the pressure chamber and non-rotatably connected to the second part of the coupling assembly. A shear channel with a control member is provided in the pressure chamber, the control member cooperating with at least one conveying plate.

In a first embodiment of the inventive coupling assembly, the shear channel with a control member forms two circumferential grooves of limited length and each covered by one of the two radial surfaces of the conveying plate, thereby forming two shear channels. The conveying plate comprises passages through which the two shear channels are connected to one another. There is also an open connection between one end of each of the two shear channels and a reservoir, and between the other end of each of the two shear channels and the pressure chamber.

In a second embodiment of the inventive coupling assembly, the shear channel with a control member forms a circumferential groove of limited arcuate length which is covered by one of the two radial surfaces of the conveying plate, thereby forming a first shear channel. In the shear channel with a control member, there is a circumferential slot of limited arcuate length which is covered by the other one of the two radial surfaces of the conveying plate and by a second conveying plate, the latter being non-rotatably connected to the second part of the coupling assembly to form a second shear channel. The first conveying plate includes fluid passages extending therethrough and connecting both shear channels to one another. There is an open fluid connection between one end of the second shear channel and a reservoir, and between the other ends of both shear channels and the pressure chamber.

In the shear channel-control member subcombination of this invention, there are formed two shear channels: in the first embodiment, both channels are formed entirely by the one and only conveying plate; in the second embodiment, one channel is formed entirely by a first conveying plate, and the second channel by the first conveying plate in cooperation with a second conveying plate. By retaining the existing external diameter of the pressure-generating assembly and by leaving the design of the main components unchanged and keeping the design changes simple, the capacity of the pressure generating unit is doubled, while only the functional parts contained in the pressure chamber are modified. Because of the sound design of the pump body member and the piston in the prior art embodiments, the present applicants' inventive structural designs can be achieved as described herein without any need for modification of those components.

Several features ensure that the coupling is effective in both directions of rotation of the first part relative to the second part. For this purpose, in the pump body member at least one axial connecting channel is provided for connecting the reservoir with the shear channels, and at least one radial connecting channel is provided for connecting the shear channels to the pressure chamber. Furthermore, in the shear channel-control member subcombination, control apertures are provided for connecting the first ends of the two shear channels to the first ones of the connecting channels and for connecting the second ends of the two shear channels to the second ones of the connecting channels. In addition, the shear channel-control member subcombination is rotatable through a limited angle relative to the pump body member so that in the first limit position, one end of each of the shear channels is connected to the reservoir, with the respective other end of each of the shear channels being connected to the pressure chamber, and that in the second limit position, each of the above-mentioned first ends of the shear channels is connected to the pressure chamber, with each of the above-mentioned second ends of the shear channels being connected to the reservoir.

The inventive through-apertures ensure that both the control apertures and the connecting channels for the two shear channels can be of simple design. According to the first preferred embodiment, the shear channel-control member subcombination consists of two dish-shaped formed sheet metal parts in which the grooves are formed by being stamped out. According to the second preferred embodiment, the shear channel-control member subcombination is formed of two dish-shaped sheet metal parts in which the groove is produced by being stamped out of the first part, with the slot being formed by being punched out of the second part.

DESCRIPTION OF THE DRAWINGS

The written description of the present invention will be more fully understood when read with reference to the accompanying drawings, of which.

DETAILED DESCRIPTION OF THE PREFERRED EMBODIMENT

Figure 1:
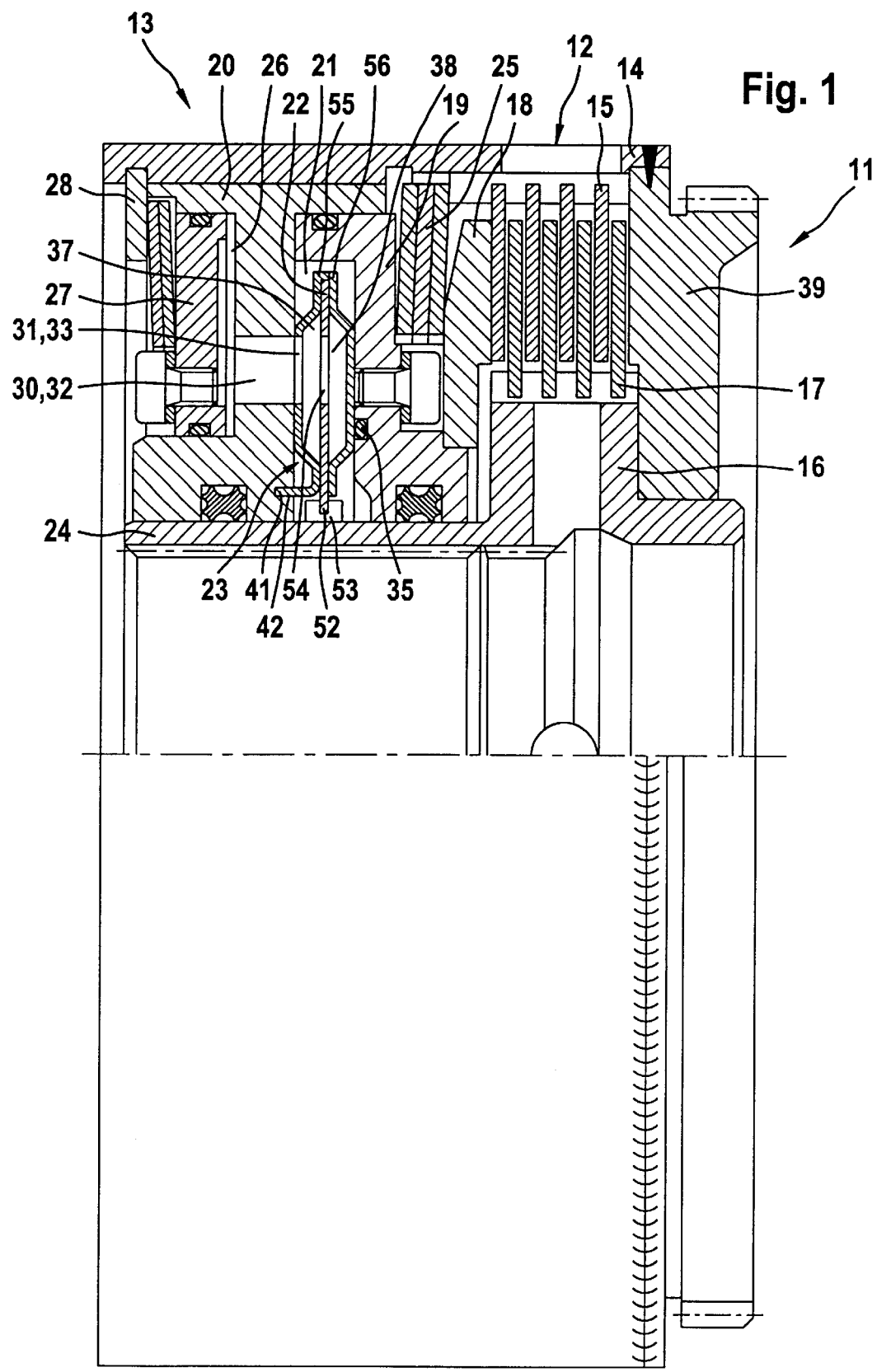
FIG. 1 is a partial sectional view of a first embodiment of the present inventive coupling assembly taken through a connection between the shear channels and the reservoir, showing two circumferential grooves in the shear channel-control member subcombination and a conveying plate.
Figure 2:
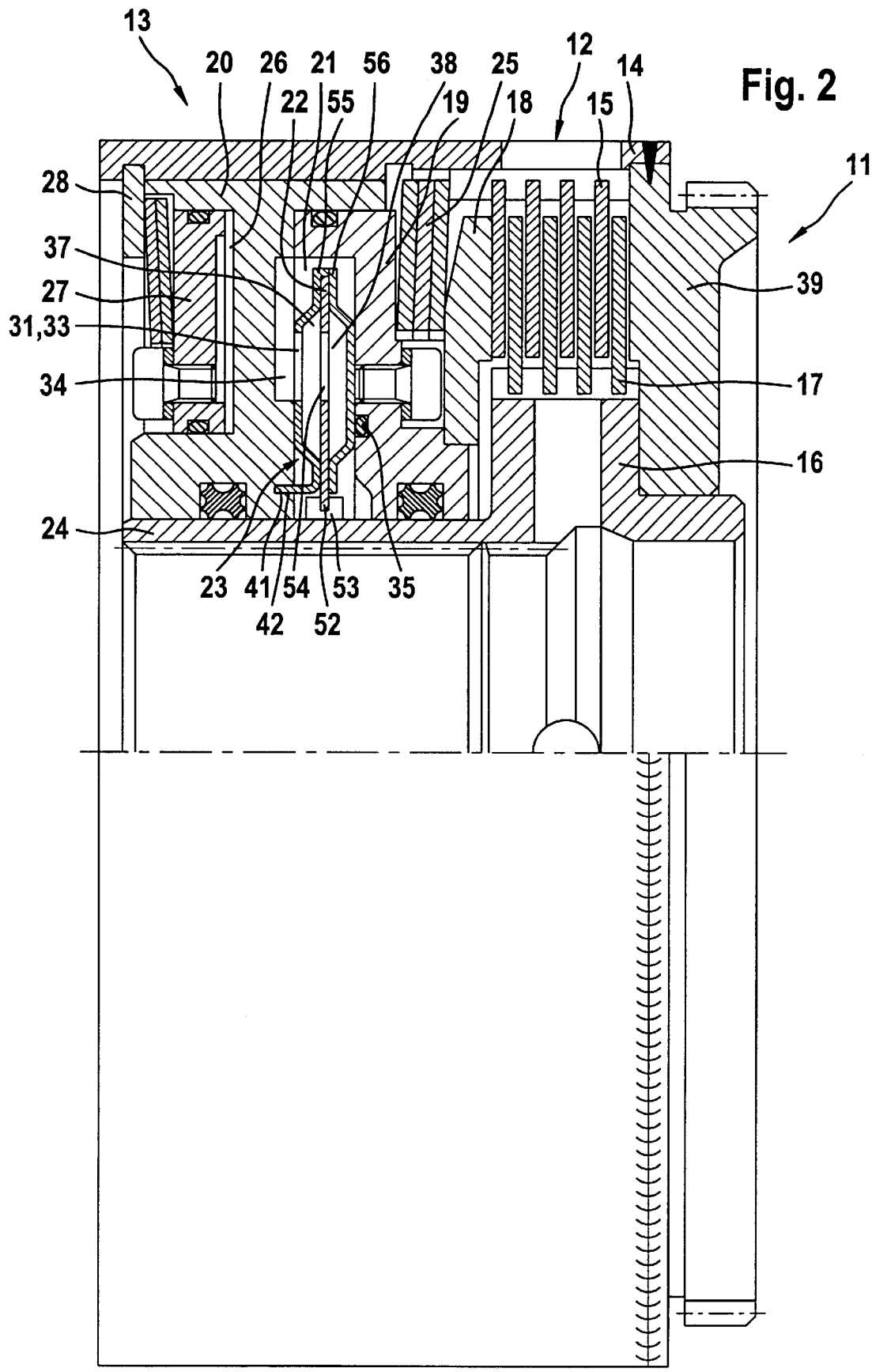
FIG. 2 is a partial sectional view of a first embodiment of the present inventive coupling assembly taken through a connection between the shear channels and the reservoir, showing two circumferential grooves in the shear channel-control member subcombination and the pressure chamber.

Referring now specifically to FIGS. 1 and 2, there is shown a coupling assembly 11 with a controllable multi-plate friction coupling 12, and a speed-sensing control assembly 13. Friction coupling 12 comprises a housing 14 in which the outer plates 15 are non-rotatably secured, and a hub 16 on which inner plates 17 are non-rotatably mounted. The friction coupling 12 is axially loadable on one side by a pressure plate 18, and is supported on the opposite side by a housing cover 39. The pressure plate 18 is, in turn, controlled by the control assembly 13 in housing 14. The control assembly 13 comprises an axially-displaceable piston 19 and a pump body member 20, both of which rotate together with the housing 14 and are rotatable and sealed relative to a hub 24. The piston 19 and the pump housing 20 are also sealed relative to one another and form a pressure chamber 21 filled with a highly viscous fluid, in which there are arranged a conveying plate 22 and a multi-element shear channel-control member subcombination 23 surrounding said conveying plate 22. The conveying plate 22 is non-rotatably connected to a second hub 24, which can be coupled to, and driven by, the first hub 16. The shear channel-control member subcombination 23 is rotatable through a predetermined arcuate increment relative to the pump housing 20 by means of a projecting rotary stop 41 which engages a partially-circumferential groove 42 in the pump housing 20. When the conveying plate 22 in the pressure chamber 21 changes its direction of rotation, it moves the shear channel-control member subcombination 23 from its one limit position relative to the circumferential groove 42 determined by the rotary stop 41 to the other limit position relative to the circumferential groove 42 determined by the rotary stop 41. An O-ring positioned in the piston 19 ensures a sealing contact between the shear channel-control member subcombination 23 and the two end faces of the pressure chamber 21. The displacement of the piston 19 relative to the pump housing 20 is effected by the pressure in the pressure chamber 21 against the pre-tensioning force of plate springs 25 which are supported between pressure plate 18 and piston 19 within the housing 14.

FIG. 1 also shows a section which, in the pump housing 20, extends through one of two axial connecting channels 30, 32 which is connected to one of two control apertures 31, 33 in the shear channel-control member subcombination. These are positioned at the ends of the shear channel 37.

FIG. 2 shows a section through a plane which extends through a radial connecting channel 34 in the pump housing 20 which is connected to the second one of the two control apertures 31, 33, as result of which the shear channel 37 is in connection with the pressure chamber 21.

Figure 3:
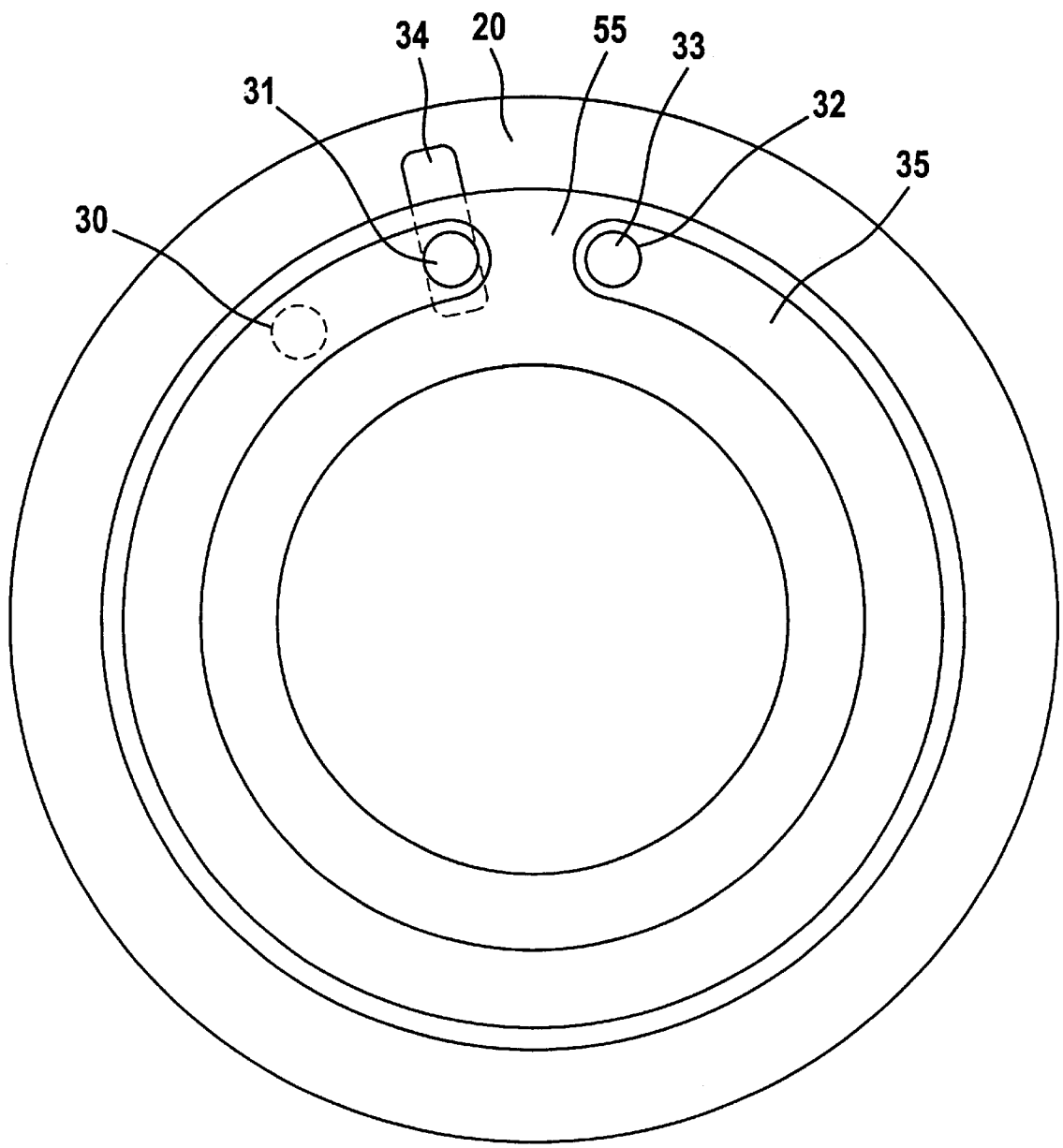
FIG. 3 is an axial (plan) view of the shear channel-control member subcombination of FIGS. 1 & 2.

The positions of the connecting channels and control apertures relative to one another ensure that when the conveying plate 22 rotates relative to the shear channel-control member subcombination 23, the highly viscous fluid is conveyed from the reservoir through the shear channels 37, 38 into the pressure chamber 21. FIG. 3 shows an axial view of the dish-shaped member 55 and the pump body member 20 from the conveying plate end. On the dish-shaped member 55, it is possible to see the stamped-out groove 35 forming the shear channel 37, and the positions of the control apertures 31, 33. At the pump body member, there are shown the position of the connecting channel 30 (in dashed lines) and the position of the connecting channel 32 which overlaps with the control apertures 33. The control aperture 31 overlaps with the radial connecting channel 34. There is thus an open connection from the reservoir via the connecting channel 32, the control aperture 33, the shear channel 37, the control aperture 31 and the connecting channel 34 to the pressure chamber. When the shear channel-control member subcombination 23 rotates anti-clockwise by the angular distance between the control apertures 31, 33, the control aperture 31 overlaps with the connecting channel 30 and the control aperture 33 overlaps with the connecting channel 34. As both positions correspond to a respective opposed direction of relative rotation of the conveying plate relative to the shear channel-control member subcombination, the fluid, in both positions, is conveyed from the reservoir through one of the two connecting channels 30, 32 and through the radial connecting channel 34 into the pressure chamber.

Figure 4:
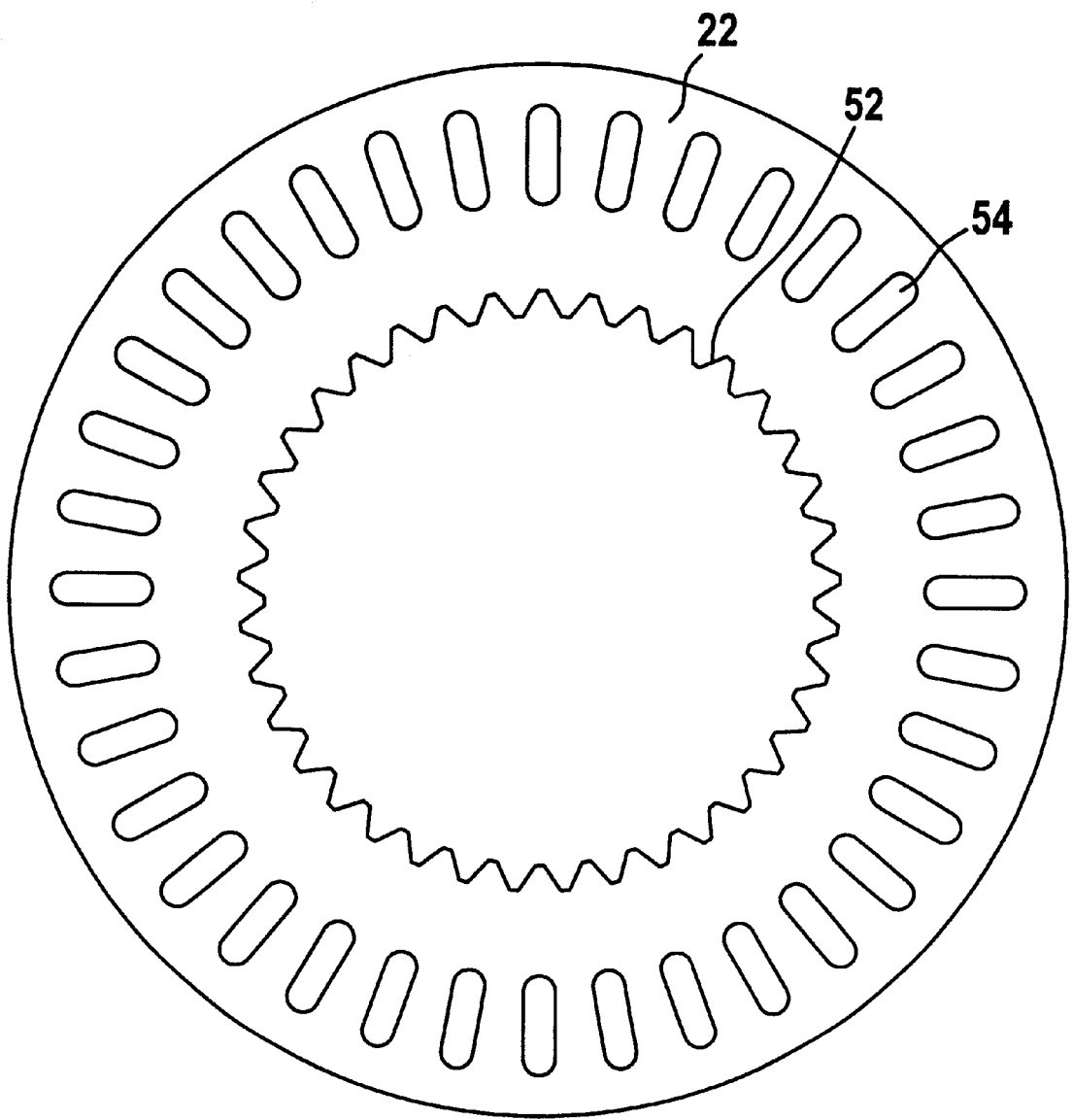
FIG. 4 is an axial (plan) view of one side of the conveying plate of the coupling assembly shown in FIGS. 1 & 2.

FIG. 4 shows the conveying plate 22 formed with slots 54, and inner teeth 52 which engage the outer teeth 53 of the hub 24.

The shear channel-control member subcombination 23 comprises a first dish-shaped member 55 with the integrally-formed rotary stop 41 and a second dish-shaped member 56 which is non-rotatably connected to the first dish-shaped member 55, for example by form-fitting means on the outer circumference. The two dish-shaped members 55, 56, together with a conveying plate 22, each form a shear channel 37, 38, with each of the shear channels being formed by being stamped out so as to be C-shaped and covering a limited circumferential angle at the respective dish-shaped member 55, 56. In the dish-shaped member 55, it is possible to see one of two control apertures 31, 33 arranged at one of the ends of the shear channel 37. In the pump housing 20, there is provided a reservoir 26 which is delimited by an axially displaceable annular piston 27 which is supported by plate springs 28 on the pump housing 20, so that changes in volume in the pressure chamber 21 can be offset by changes in volume in the reservoir 26.

Figure 5:
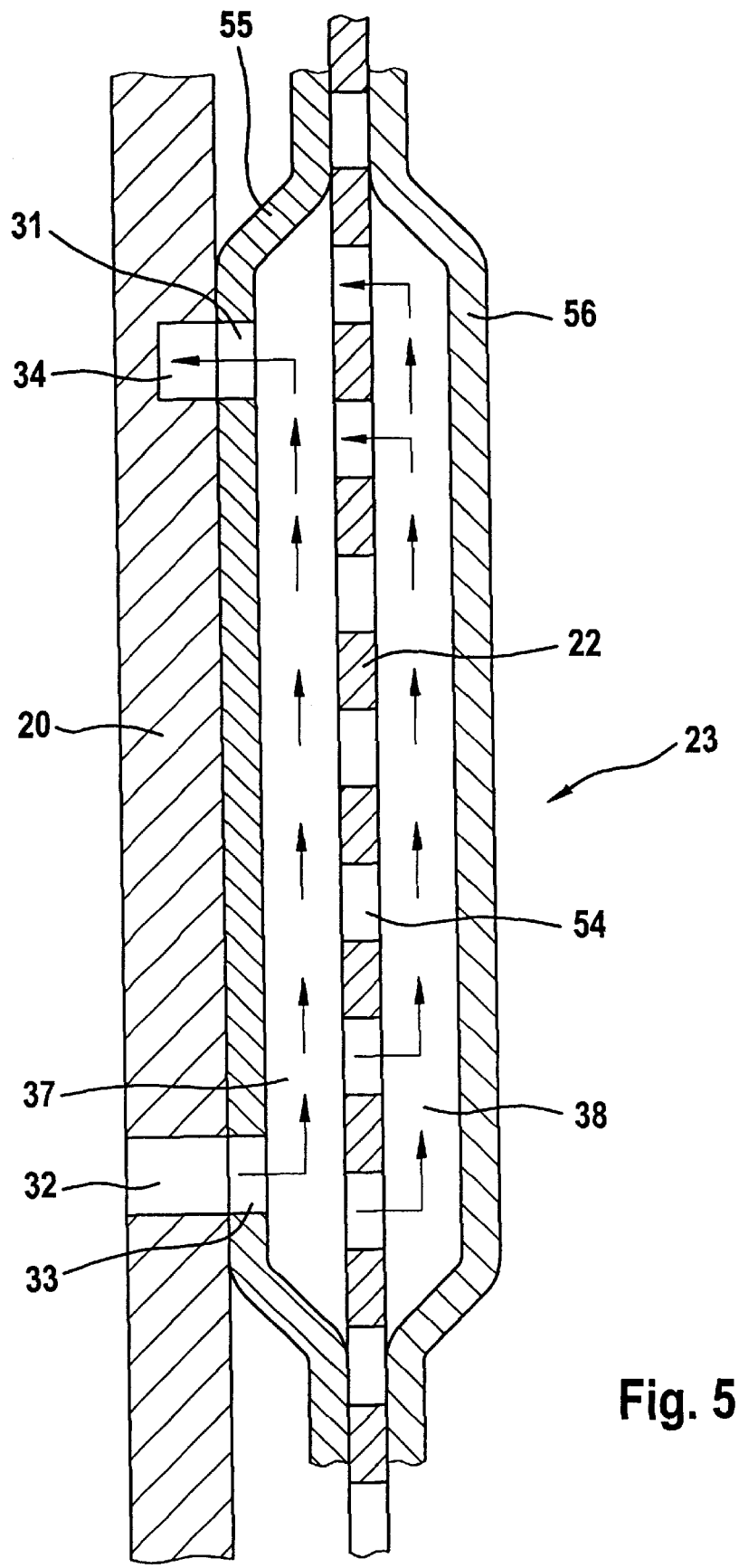
FIG. 5 is a sectional side view of the shear channel-control member subcombination with the conveying plate and the pump body member of the coupling assembly shown in FIGS. 1 & 2.

FIG. 5 shows how, as a result of the relative movement of the conveying plate 22 relative to the shear channel-control member subcombination 23, a highly viscous medium is conveyed through the connecting channel 32 and the control aperture 33 to the control aperture 31 and the connecting channel 34, with a highly viscous medium being conveyed through the slots 54 in the conveying plate 22 at both ends of the conveying plate in the shear channels 37 and 38, as indicated by the flow and pressure arrows.

Figure 6:
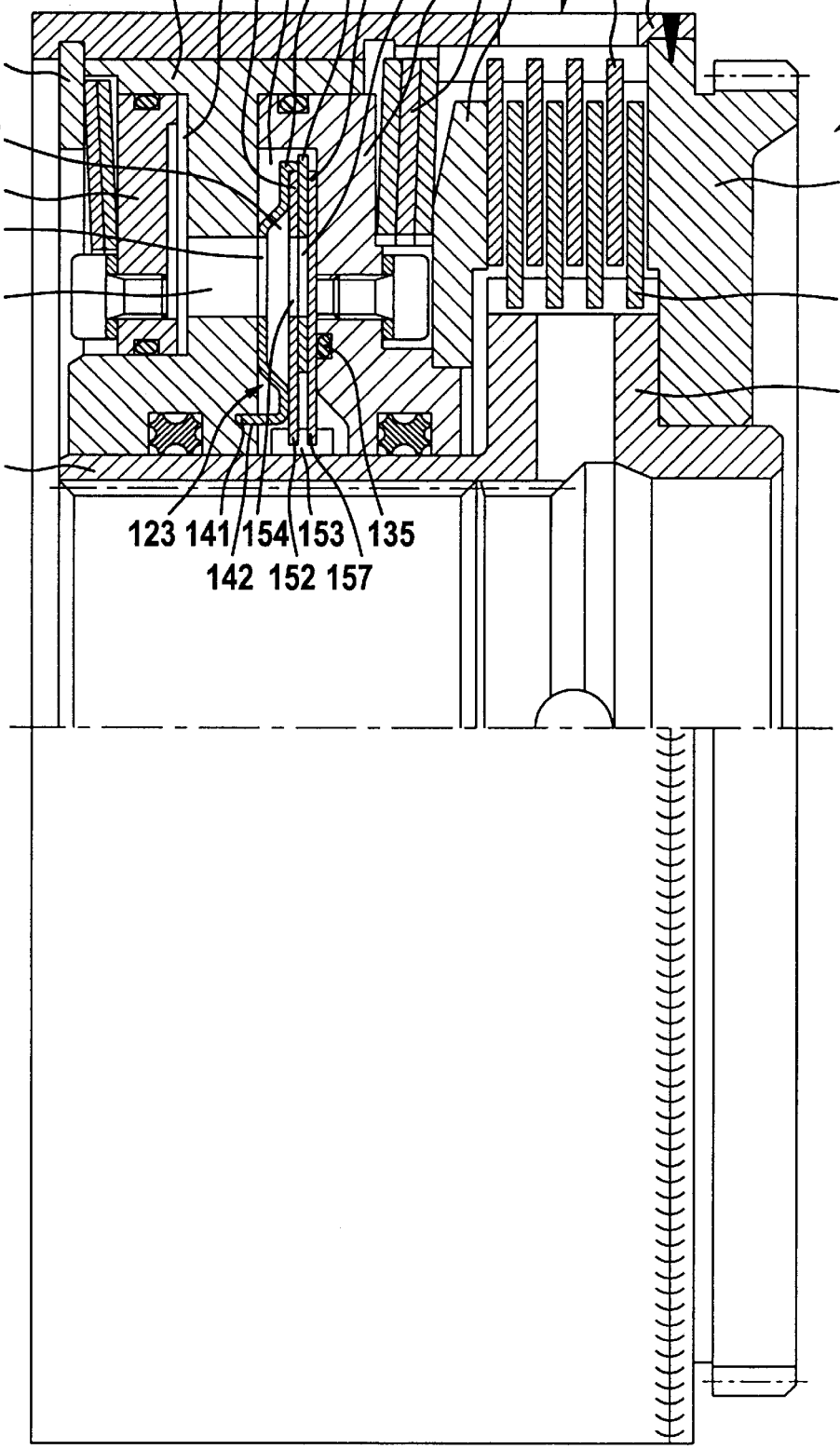
FIG. 6 is a partial sectional view of a second embodiment of the present inventive coupling assembly taken through a connection between the shear channels and the reservoir, showing a circumferential groove and a circumferential slot in the shear channel-control member subcombination and two conveying plates.
Figure 7:
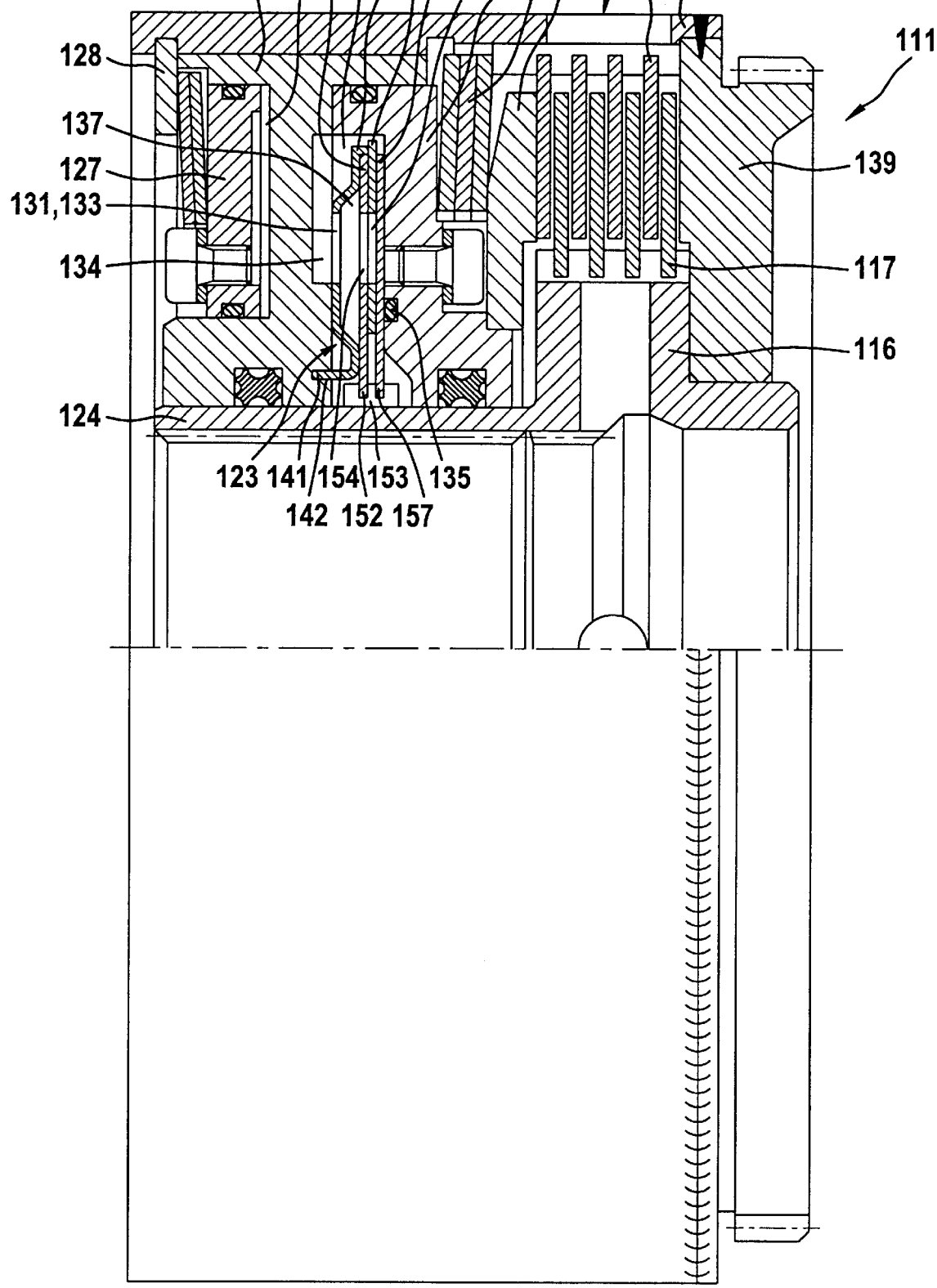
FIG. 7 is a partial sectional view of a second embodiment of the present inventive coupling assembly taken through a connection between the shear channels and the pressure chamber, showing a circumferential groove and a circumferential slot in the shear channel-control member subcombination and two conveying plates.

Referring now specifically to FIGS. 6 and 7, there is shown the same coupling assembly 111 comprising a controllable multi-plate friction coupling 112, and a speed-sensing control assembly 113. The friction coupling 112 comprises a housing 114 in which the outer plates 115 are non-rotatably held, and a hub 116 on which inner plates 117 are non-rotatably mounted. The friction coupling 112 is axially loadable on one side by a pressure plate 118, and is axially supported on the opposite side by a housing cover 139. The pressure plate 118, in turn, is controlled by said control assembly 113 in the housing 114. Control assembly 113 comprises an axially-displaceable piston 119 and a pump body member 120, both of which rotate together with the housing 114 and are rotatable and sealed relative to a further hub 124. The piston 119 and the pump housing 120 are also sealed relative to one another and form a pressure chamber 121 which is filled with a highly viscous fluid and in which there are arranged a first conveying plate 122, a multi-part shear channel-control member subcombination 123 surrounding said first conveying plate 122 and a second conveying plate 129 contacting said shear channel-control member subcombination 123. The conveying plates 122, 129 are non-rotatably connected to the hub 124, which can be coupled to, and driven by, the first hub 116. The shear channel-control member subcombination 123 is rotatable through a predetermined arcuate increment relative to the pump housing 120 by a projecting rotary stop 141 which engages a partially-circumferential groove 142 in the pump housing 120. When the conveying plates 122, 129 in the pressure chamber 121 change their direction of rotation, they move the shear channel-control member subcombination 123 from its one end position relative to the circumferential groove 142 determined by the rotary stop 141 into the other end position relative to the circumferential groove 142 determined by the rotary stop 141. An O-ring positioned in the piston 119 ensures a sealing contact between the shear channel-control member subcombination 123 and the two end faces of the pressure chamber 121. The displacement of the piston 119 relative to the pump housing 120 is effected by the pressure in the pressure chamber 121 against the pre-tensioning force of plate springs 125 which are supported on the housing 114.

FIG. 6 shows a section which, in the pump housing 120, extends through one of two axial connecting channels 130, 132 which is connected to one of two control apertures 131, 133 in the shear channel-control member subcombination. These are positioned at the ends of the shear channel 137.

FIG. 7 shows a section through a plane which extends through a radial connecting channel 134 in the pump housing 120 which is connected to the second one of the two control apertures 131, 133, as a result of which the shear channel 137 is in connection with the pressure chamber 121.

The positions of the connecting channels and control apertures relative to one another ensure that when the conveying plates 122, 129 rotate relative to the shear channel-control member subcombination 123, the highly viscous fluid is conveyed from the reservoir 126 through the shear channels 137, 138 into the pressure chamber 121.

Figure 8:
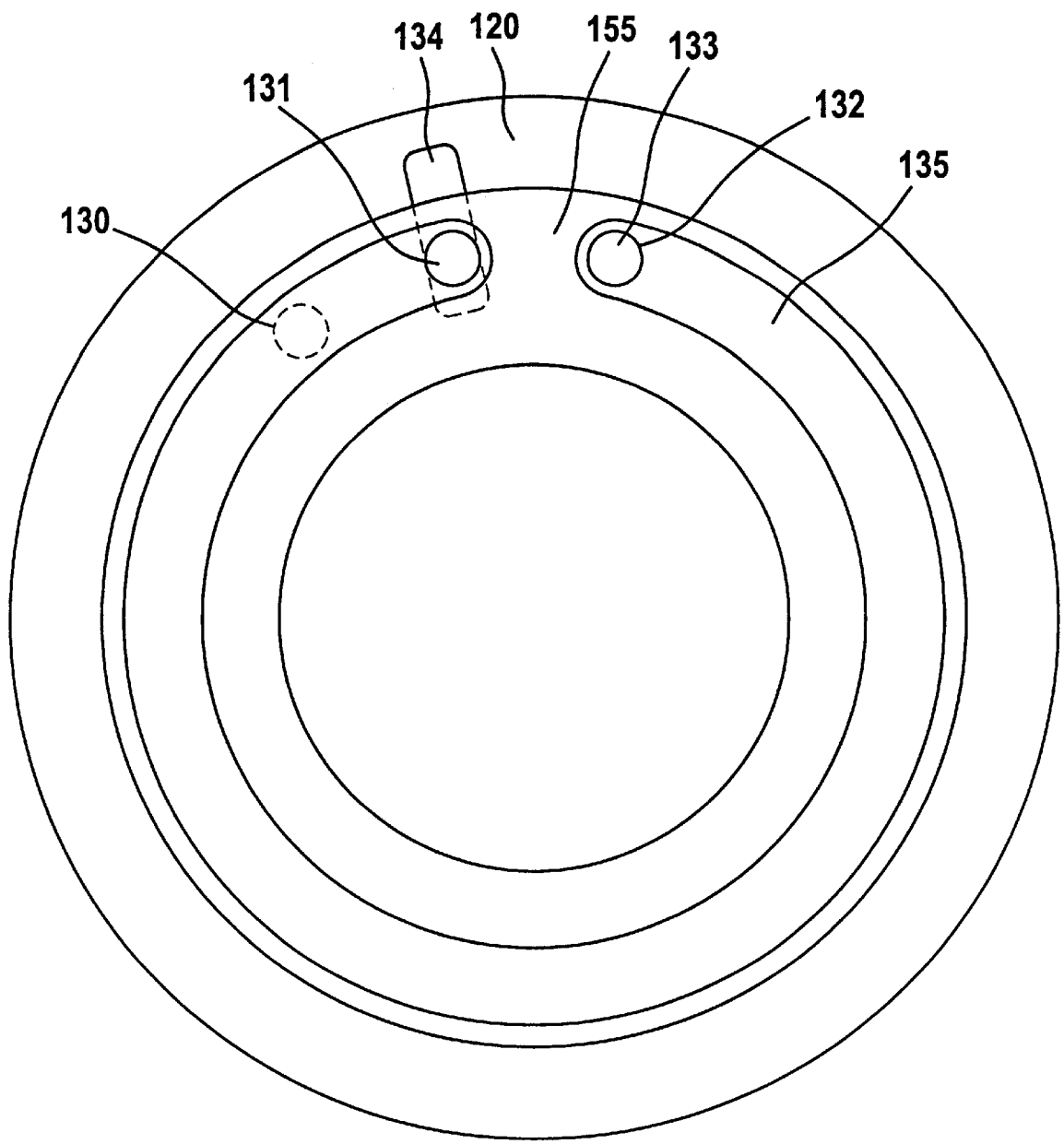
FIG. 8 is an axial (plan) view of the shear channel-control member subcombination of FIGS. 6 & 7.

FIG. 8 shows an axial view of the dish-shaped member 55 120 from the conveying plate end. At the dish-shaped member 155, it is possible to see the stamped-out groove 135 forming the shear channel, and the positions of the control apertures 131, 133. At the pump body member, there is shown (in dashed lines) the position of the connecting channel 130, and the position of the connecting channel 132 which overlaps with the control aperture 133. The control aperture 131 overlaps with the radial connecting channel 134. There is thus an open connection from the reservoir via the connecting channel 132, the control aperture 133, the shear channel 137, the control aperture 131 and the connecting channel 134 to the pressure chamber. When the shear channel-control member subcombination rotates anti-clockwise by the angular distance between the control apertures 131, 133, the control aperture 131 overlaps with the connecting channel 130 and the control aperture 133 overlaps with the connecting channel 134. As both positions correspond to a respective opposed direction of relative rotation of the conveying plates relative to the shear channel-control member subcombination, the fluid, in both positions, is conveyed from the reservoir through one of the two connecting channels 130, 132 and through the radial connecting channel 134, into the pressure chamber.

Figure 9:
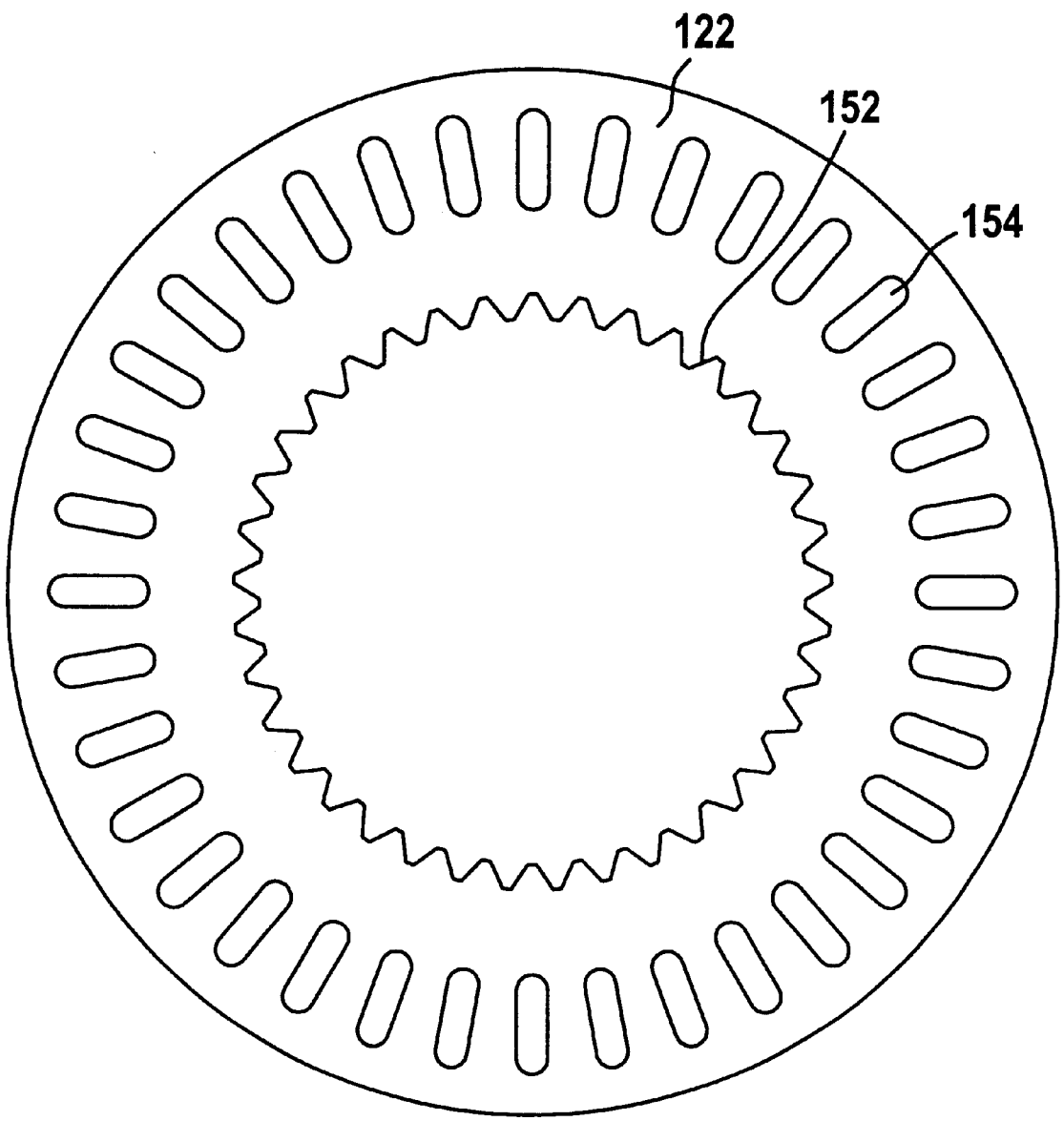
FIG. 9 is an axial (plan) view of the first conveying plate of the coupling assembly shown in FIGS. 6 & 7.

FIG. 9 shows the first conveying plate 122 formed with slots 154, and inner teeth 152 which engage the outer teeth 153 of the hub 124. The second conveying plate 129 is connected by inner teeth 157 to the outer teeth 153 of the hub and forms a closed surface. The shear channel-control member subcombination 123 comprises a first dish-shaped member 155 with the integrally-formed rotary stop 141, and a second dish-shaped member 156 which is non-rotatably connected to the first dish-shaped member 155, for example by form-fitting means on the outer circumference. The dish-shaped member 155 forms a shear channel 137 with the conveying plate 122, with the shear channel being formed by a stamped-out C-shaped groove 135 which covers a limited circumferential angle at the dish-shaped member 155. The dish-shaped member 156 forms a shear channel 138 with the two contacting conveying plates 122 and 129, with the shear channel being formed by a C-shaped slot 136 which covers a limited circumferential angle in the dish-shaped member. In the dish-shaped member 155 it is possible to see one of two control apertures 131, 133 which are arranged at one of the ends of the shear channel 137. In the pump housing 120, there is provided a reservoir 126 which is delimited by an axially displaceable annular piston 127 which is supported by plate springs 128 on the pump housing 120, so that changes in volume in the pressure chamber 121 can be offset by changes in volume in reservoir 126.

Figure 10:
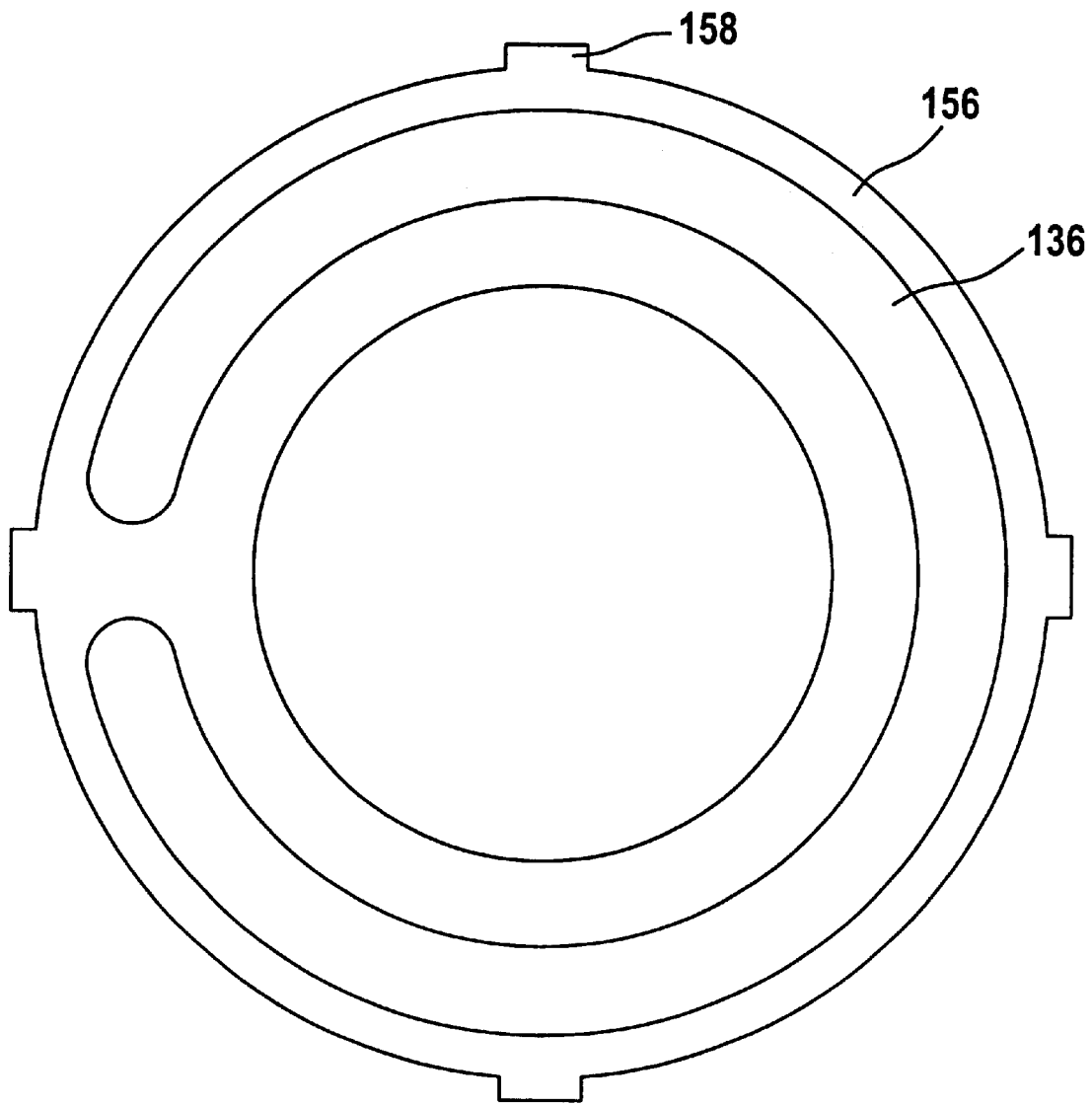
FIG. 10 is an axial (plan) view of one side of the shear channel-control member subcombination with the circumferential slot.

FIG. 10 shows the disc member 156 comprising a circumferential slot 136 which, together with the two contacting conveying plates, forms the second shear channel. At the circumference, there are provided driving elements 158 which ensure a form-fitting connection with the dish-shaped member 155.

Figure 11:
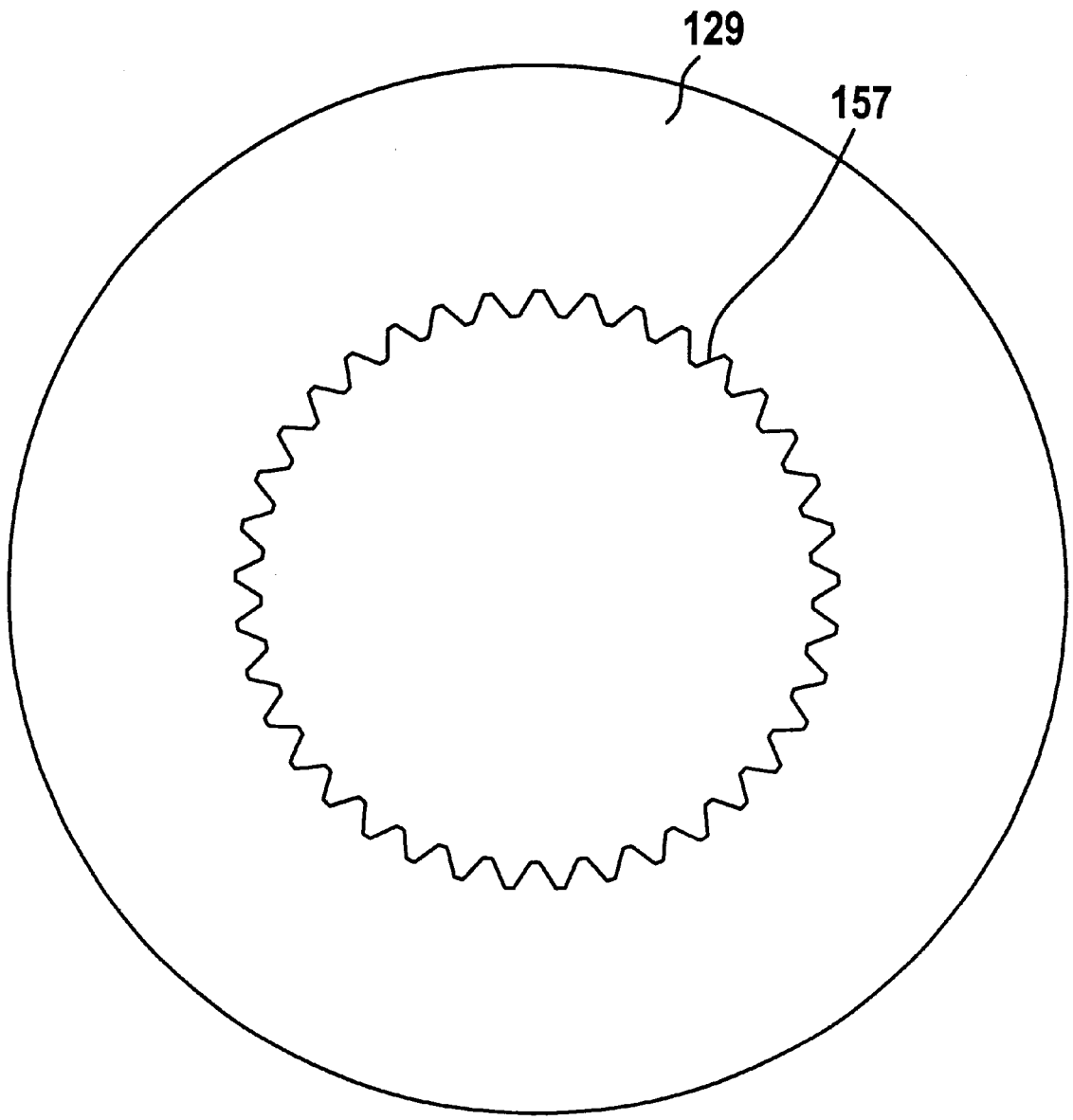
FIG. 11 is a plan view of one side of the second conveying plate shown in FIGS. 6 and 7.

FIG. 11 shows the second conveying plate 129 which comprises inner teeth 157 for providing a non-rotatable connection with the hub 124 and which forms a closed disc for covering the circumferential slot of the disc member.

Figure 12:
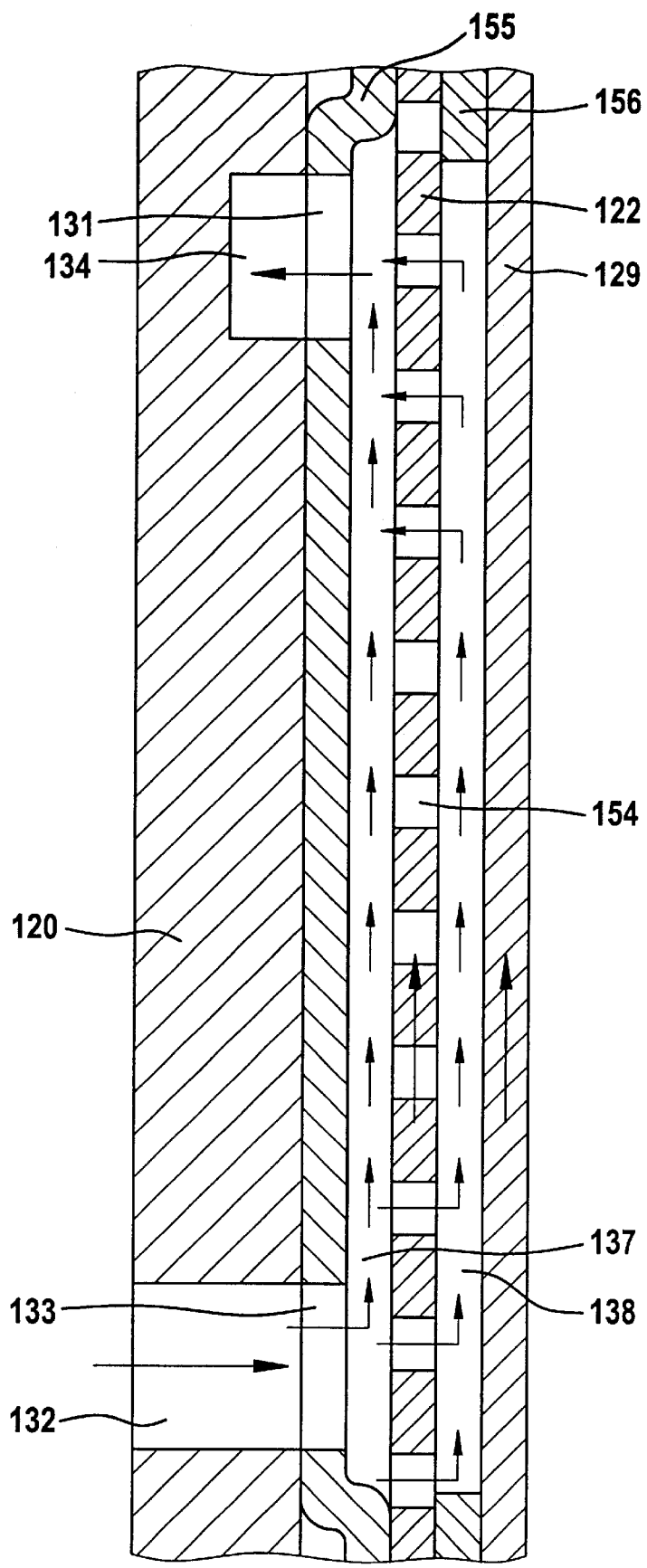
FIG. 12 is a partial sectional side view of the shear channel-control member subcombination with the conveying plates and the pump body member of the coupling assembly shown in FIGS. 6 and 7.

FIG. 12, in a cylindrical section, shows how, as a result of a relative movement of the conveying plates 122, 129 relative to the shear channel-control member subcombination 123, a highly viscous medium is conveyed through the connecting channel 132 and the control aperture 133 to the control aperture 131 and to the connecting channel 134, with the highly viscous medium being conveyed through the slots 154 in the conveying plate 122 at both ends of the first conveying plate in the shear channels 137 and 138, as indicated by the flow and pressure arrows.

Certain modifications and variations of the disclosed embodiments of the present invention will be apparent to those skilled in the art. It should be understood that the disclosed embodiments are intended to be illustrative only, and not in any way restrictive of the scope of the invention as defined by the claims set forth hereunder.

We claim:

1. A coupling assembly for transmitting torque between a first part and a second part, said parts being rotatable with respect to one another, said coupling assembly comprising: said first and second parts and (a) friction coupling means selectively operable to transmit torque between said first and second part of the coupling assembly; and (b) control means for said friction coupling means comprising: pressure generating means comprising a pump body member non-rotatably connected to said first part of the coupling assembly; an axially-displaceable piston for loading the friction coupling means; a pressure chamber formed by said pump body member and by said piston and filled with a highly viscous fluid; at least one conveying plate in said pressure chamber and non-rotatably connected to the second part of the coupling assembly; two shear channels, each at least partially formed by a shear channel-control member subcombination positioned in said pressure chamber, said control member cooperating with said at least one conveying plate; and fluid connecting means operative to connect said shear channels to one another and to a reservoir.

2. A coupling assembly according to claim 1, wherein two circumferential grooves of limited arcuate length are formed in said shear channel-control member subcombination, each being covered by one of the two radial surfaces of said conveying plate to form said two shear channels, having two ends each and said fluid connecting means comprises (i) through passages in said at least one conveying plate connecting said two shear channels to one another and (ii) an open connection between the one end of each of said shear channels and a reservoir and between the other end of each of said shear channels and said pressure chamber.

3. A coupling assembly according to claim 1 having first and second conveying plates, said second conveying plate being non-rotatably connected to said second part of the coupling assembly, a circumferential groove of limited arcuate length formed in said shear channel control member subcombination and covered by one of the two radial surfaces of said first conveying plate to form a first shear channel, and a circumferential slot of limited arcuate length formed in the shear channel-control member subcombination and covered by the other one of the two radial surfaces of the first conveying plate on the one hand and by said second conveying plate on the other hand to form a second shear channel, said shear channels having two ends each and said fluid connecting means comprises (i) through-passages in said first conveying plate which connect said shear channels to one another and (ii) an open connection between one end of each of said shear channels and a reservoir and between the other end of each of said shear channels and said pressure chamber.

4. A coupling assembly according to any one of claims 2 or 3, wherein said pump body member comprises at least one axial connecting channel for connecting said reservoir with said shear channels, and said pump body member further comprises at least one radial connecting channel for connecting said shear channels to said pressure chamber.

5. A coupling assembly according to claim 4, wherein control apertures connect each of one of the ends of said two shear channels to first ends of said connecting channels and connect the other ends of said shear channels to second ends of said connecting channels.

6. A coupling assembly according to claim 1, wherein said shear channels having two ends each, and said shear channel-control member subcombination is rotatable through a limited angle relative to the pump body member and that, in a first limit position, one end of each of the shear channels is connected to the reservoir, with the respective other end of each of the shear channels being connected to the pressure chamber and that in a second limited position, each of the above-mentioned one of the ends of the shear channels is connected to the pressure chamber, with each of the above-mentioned other ends of the shear channels being connected to the reservoir.

7. A coupling assembly according to any of claims 1 or 2 wherein said shear channel-control member subcombination consists of two dish-shaped formed sheet metal parts in which said grooves are formed by being stamped out.

8. A coupling assembly according to any of claims 1 or 3 wherein said shear channel-control member subcombination is formed of first and second dish-shaped sheet metal parts in which said groove is produced by being stamped out of said first dish-shaped sheet metal part, with said slot being punched out of said second dish-shaped sheet metal part.

9. A coupling assembly (11) for transmitting torque between a first part (14) and a second part (16), which parts (14, 16) are rotatable relative to one another, said coupling assembly (11) comprising said first and second parts (14, 16) and a friction coupling means (12) having first friction plates (15) non-rotatably connected to the first part (14) of the coupling assembly and having second friction plates (17) non-rotatably connected to the second part (16) of the coupling assembly, and further comprising pressure generating means (13) comprising a pump body member (20) and an axially-displaceable piston (19) for loading the friction coupling means (12), and a pressure chamber (21) formed by the pump body member (20) and by the piston (19) and filled with a highly viscous fluid, wherein the pump body member (20) is non-rotatably connected to the first part (14) of the coupling assembly (11) and wherein at least one conveying plate (22) is provided in the pressure chamber (21), which conveying plate (22) is non-rotatably connected to the second part (16) of the coupling assembly (11), and wherein a shear channel-control member subcombination (23) is provided in the pressure chamber (21), which member (23) cooperates with at least one conveying plate (22), characterised in that the shear channel-control member subcombination (23) forms two circumferential grooves (35, 36) which are of limited length and which are each covered by one of the two radial surfaces of the conveying plate (22) and thus form two shear channels (37, 38), and that the conveying plate (22) comprises through passages (54) which connect the two shear channels (37, 38) to one another, and that there is an open connection between the one end of said shear channels and a reservoir (26) and between the other end of said shear channels and the pressure chamber (21).

10. A coupling assembly (111) for transmitting torque between a first part (114) and a second part (116), which parts (114, 116) are rotatable relative to one another, said coupling assembling (111) comprising said first and second parts (114, 116) and friction coupling means (112) having first friction plates (115) non-rotatably connected to the first part (114) of the coupling assembly (111) and having second friction plates (117) non-rotatably connected to the second part (116) of the coupling assembly (111), and further comprising a pressure generating device (113) comprising a pump body member (120) and an axially-displaceable piston (119) for loading the friction coupling means (112), and a pressure chamber (121) formed by the pump body member (120) and by the piston (119) and filled with a highly viscous fluid, wherein the pump body member (120) is non-rotatably connected to the first part (114) of the coupling assembly (111) and wherein at least one conveying plate (122) is provided in the pressure chamber (121), which conveying plate (122) is non-rotatably connected to the second part (116) of the coupling assembly (111), and wherein a shear channel-control member subcombination (123) is provided in the pressure chamber (121), which member (123) cooperates with at least one conveying plate (22), characterised in that the shear channel-control member subcombination (123) forms a circumferential groves (135) which is of limited arcuate length and which is covered by one of the two radial surfaces of the conveying plate (122) to form a first shear channel (137), and in the shear channel-control member subcombination (123) there is provided a circumferential slot (136) which is of limited arcuate length and which is covered by the other one of the two radial surfaces of the conveying plate (122) on the one hand and by a second conveying plate (129) on the other hand, which is also non-rotatably connected to the second part (116) of the coupling assembly (111) to form a second shear channel (138), that the first conveying plate (122) comprises through-passages (154) which connect the shear channels (137, 138) to one another, and that there is an open connection between the one end of said shear channels and a reservoir (126) and between the other end of said shear channels and the pressure chamber (121).

11. A coupling assembly (111) according to any one of claims 9 or 10, characterised in that the pump body member (20; 120) comprises at least one axial connecting channel (30, 32; 130, 132) for connecting the reservoir (26; 126) with the shear channels (37, 38; 137, 138), and the pump body member (20; 120) further comprises at least one radial connecting channel (34; 134) for connecting the shear channels (37, 38; 137, 138) to the pressure chamber (21; 121).

12. A coupling assembly (111) according to claim 11, characterised in that control apertures (31, 33; 131; 133) connect the first ones of the two shear channels (37, 38; 1376, 138) to the first ends of the connecting channels and connect the second ends of the two shear channels (37, 38; 137, 138) to the second ones of the connecting channels.

13. A coupling assembly (111) according to any one of claims 9 or 10, characterised in that the shear channel-control member subcombination (23; 123) is rotatable through a limited angle relative to the pump body member (20; 120) and that, in a first limit position, one end of each of the shear channels (37, 38; 137, 138) is connected to the reservoir (26; 126), with the respective other end of each of the shear channels (37, 38; 137, 138) being connected to the pressure chamber (21; 121) and that in a second limit position, each of the above-mentioned first ends of the shear channels (37, 38; 137, 138) is connected to the pressure chamber (21; 121), with each of the above-mentioned second ends of the shear channels (37, 38; 137, 138) being connected to the reservoir (26; 126).

14. A coupling assembly (111) according to claim 9, characterised in that the shear channel-control member subcombination (23) consists of two dish-shaped formed sheet metal parts (55, 56) in which the grooves (35, 36) are formed by being stamped out.

15. A coupling assembly (111) according to claim 10, characterised in that the shear channel-control member subcombination (123) is formed of two dish-shaped sheet metal parts (155, 156) in which the groove (135) is produced by being stamped out of the first part (155), with the slot (136) being produced by being punched out of the second part (156).

* * * * *

UNITED STATES PATENT AND TRADEMARK OFFICE
CERTIFICATE OF CORRECTION

PATENT NO.   : 6,296,095 B1
DATED        : October 2, 2001
INVENTOR(S)  : Frank Bottger & Theodor Gassmann It is certified that error appears in the above-identified patent and that said Letters Patent is hereby corrected as shown below:

Column 8, claim 3,
Line 12, "said shear channel control member" should read -- said shear channel-control member --.

Column 8, claim 6,
Line 45, "second limited position" should read -- second limit position --.

Column 9, claim 10,
Line 47, "with at least one conveying plate" should read -- with the at least one conveying plate --.
Line 49, "a circumferential groves" should read -- a circumferential groove --.

Signed and Sealed this

Sixteenth Day of April, 2002

*Attest:*

JAMES E. ROGAN
*Attesting Officer*   *Director of the United States Patent and Trademark Office*